(12) United States Patent
Lee et al.

(10) Patent No.: US 8,879,029 B2
(45) Date of Patent: Nov. 4, 2014

(54) METHOD OF FABRICATING COLOR FILTER SUBSTRATE FOR LIQUID CRYSTAL DISPLAY DEVICE

(75) Inventors: Jae-Min Lee, Gyeonggi-do (KR); Hyeon-Jin Seo, Gyeongsangbuk-do (KR); Ki-Soub Yang, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 1144 days.

(21) Appl. No.: 12/635,078

(22) Filed: Dec. 10, 2009

(65) Prior Publication Data

US 2011/0019134 A1    Jan. 27, 2011

(30) Foreign Application Priority Data

Jul. 27, 2009  (KR) .................. 10-2009-0068457

(51) Int. Cl.
*G02F 1/1335* (2006.01)
*G02F 1/1333* (2006.01)
*G02F 1/13* (2006.01)

(52) U.S. Cl.
CPC .......... *G02F 1/133516* (2013.01); *G02F 2001/133519* (2013.01)
USPC ............... 349/106; 349/110; 349/187

(58) Field of Classification Search
CPC ........... G02F 1/133514; G02F 1/133516; G02F 2001/133514; G02F 2001/133519
USPC ................................. 349/106
See application file for complete search history.

(56) References Cited

U.S. PATENT DOCUMENTS

| | | | | |
|---|---|---|---|---|
| 5,101,289 A | * | 3/1992 | Takao et al. | 349/106 |
| 6,022,647 A | * | 2/2000 | Hirose et al. | 430/7 |
| 6,067,140 A | * | 5/2000 | Woo et al. | 349/129 |
| 6,399,257 B1 | * | 6/2002 | Shirota et al. | 430/7 |
| 6,801,274 B2 | * | 10/2004 | Suzuki | 349/106 |
| 6,806,925 B2 | * | 10/2004 | Ishii et al. | 349/106 |
| 7,050,130 B2 | * | 5/2006 | Sohn et al. | 349/106 |
| 7,354,520 B2 | * | 4/2008 | Okada et al. | 216/11 |
| 7,538,839 B2 | * | 5/2009 | Maeda et al. | 349/114 |
| 8,465,671 B2 | * | 6/2013 | Cho et al. | 252/299.1 |
| 2001/0007733 A1 | * | 7/2001 | Matsuyama et al. | 430/7 |
| 2004/0095527 A1 | * | 5/2004 | Liao | 349/106 |
| 2005/0139839 A1 | * | 6/2005 | Park | 257/79 |
| 2007/0077502 A1 | * | 4/2007 | Moriya | 430/7 |
| 2008/0018836 A1 | * | 1/2008 | Huh et al. | 349/106 |

FOREIGN PATENT DOCUMENTS

| | | |
|---|---|---|
| JP | 2007-72283 A | 3/2007 |
| JP | 2008-76828 A | 4/2008 |
| KR | 100826987 B1 | 4/2008 |

* cited by examiner

*Primary Examiner* — Michael Caley
*Assistant Examiner* — Jia Pan
(74) *Attorney, Agent, or Firm* — Morgan, Lewis & Bockius LLP (57) ABSTRACT

A method of fabricating a color filter substrate for a liquid crystal display device includes steps of forming a black matrix having a first thickness on a substrate, which includes first, second and third pixel regions, the black matrix surrounding each of the first, second and third pixel regions, forming red, green and blue color filter patterns using an inkjet apparatus, the red, green and blue color filter patterns disposed in the first, second and third pixel regions, respectively and having a second thickness, and forming an overcoat layer on a substantially entire surface of the substrate including the black matrix and the red, green and blue color filter patterns, the overcoat layer having a third thickness, wherein a difference between the first and second thicknesses is less than 15% of the third thickness such that the overcoat layer has an even top surface.

14 Claims, 12 Drawing Sheets

METHOD OF FABRICATING COLOR FILTER SUBSTRATE FOR LIQUID CRYSTAL DISPLAY DEVICE

The present application claims the benefit of Korean Patent Application No. 10-2009-0068457 filed in Korea on Jul. 27, 2009, which is hereby incorporated by reference.

BACKGROUND OF THE INVENTION

1. Field of the Invention

The present invention relates to a liquid crystal display (LCD) device, and more particularly to a method of fabricating a color filter substrate for a liquid crystal display device.

2. Discussion of the Related Art

With the rapid development in information technology, flat panel display (FPD) devices having thin thickness, light weight, and lower power consumption have been introduced and developed.

Among these devices, liquid crystal display (LCD) devices are most widely used for monitors of notebook computers, monitors of personal computers and televisions due to high definition, high qualities, excellent moving images and high contrast ratio.

An LCD device includes two substrates and a liquid crystal layer interposed between the two substrates. Electrodes are formed on respective substrates, and the substrates are disposed such that the electrodes face each other. An electric field is induced between the electrodes when voltages are applied to the electrodes. The alignment direction of the liquid crystal molecules is controlled by varying the intensity of the electric field, and the transmittance of light through the liquid crystal layer is changed to display images.

Figure 1:
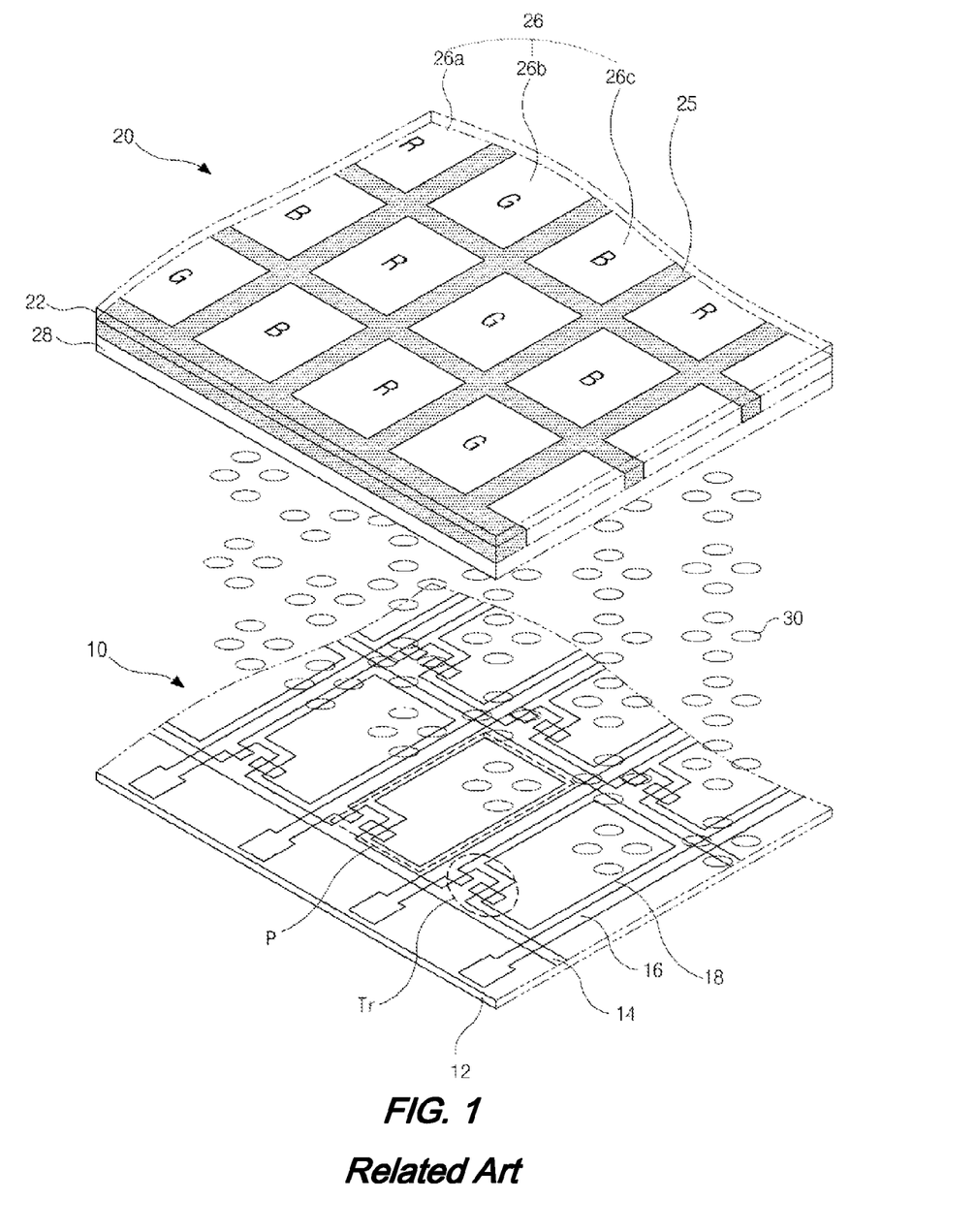
FIG. 1 is an exploded perspective view of an LCD device according to the related art.

FIG. 1 is an exploded perspective view of an LCD device according to the related art. As shown in FIG. 1, the LCD device includes an array substrate 10, a color filter substrate 20 and a liquid crystal layer 30. The array substrate 10 and color filter substrate 20 face each other, and the liquid crystal layer 30 is interposed therebetween.

The array substrate 10 includes gate lines 14 and data lines 16 on an inner surface of a transparent substrate 12. The gate lines 14 and the data lines 16 cross each other such that regions formed between the gate and data lines 14 and 16 are defined as pixel regions P. A thin film transistor Tr is formed at each crossing portion of the gate and data lines 14 and 16, and a pixel electrode 18 is formed in each pixel region P and connected to the thin film transistor Tr.

The color filter substrate 20 includes a black matrix 25, a color filter layer 26, and a common electrode 28 on an inner surface of a transparent substrate 22 facing the array substrate 10. The black matrix 25 has a lattice shape to cover a non-display region such as the gate lines 14, the data lines 16, the thin film transistors Tr, and so on. The color filter layer 26 includes red, green and blue color filter patterns 26a, 26b, and 26c repeatedly arranged in order. Each of the color filter patterns 26a, 26b, and 26c corresponds to each pixel region P. The common electrode 28 is formed on the black matrix 25 and the color filter layers 26 and over an entire surface of the substrate 22.

A sealant (not shown) is formed along peripheries of the array substrate 10 and the color filter substrate 20 to prevent liquid crystal molecules of the liquid crystal layer 30 from leaking. An alignment layer (not shown) is formed between the liquid crystal layer 30 and each of the array substrate 10 and the color filter substrate 20 to determine an initial direction of the liquid crystal molecules. A polarizer (not shown) is disposed on an outer surface of at least one of the array substrate 10 and the color filter substrate 20. A backlight unit (not shown) is disposed on an outer surface of the array substrate 10 to provide lights.

Scan signals for turning on/off the thin film transistors Tr are sequentially applied to the gate lines 14, and data signals are applied to the pixel electrodes 18 in the selected pixel regions P through the data lines 16. An electric field perpendicular to the substrates 12 and 22 is induced between the pixel electrodes 18 and the common electrode 28. The arrangement of the liquid crystal molecules is controlled by the electric field, and the transmittance of light is changed by varying the arrangement of the liquid crystal molecules to thereby display images.

In the LCD device, the color filter layer 26 is formed by a pigment dispersion method, a dyeing method, an electro-deposition method or a thermal imaging method. In general, the pigment dispersion method is more commonly used because it forms a fine pattern with good reproducibility.

FIGS. 2A to 2D are cross-sectional views showing a color filter substrate for a liquid crystal display (LCD) device in steps of a method of fabricating the same according to the related art. Here, the pigment dispersion method is used.

Figure 2A:
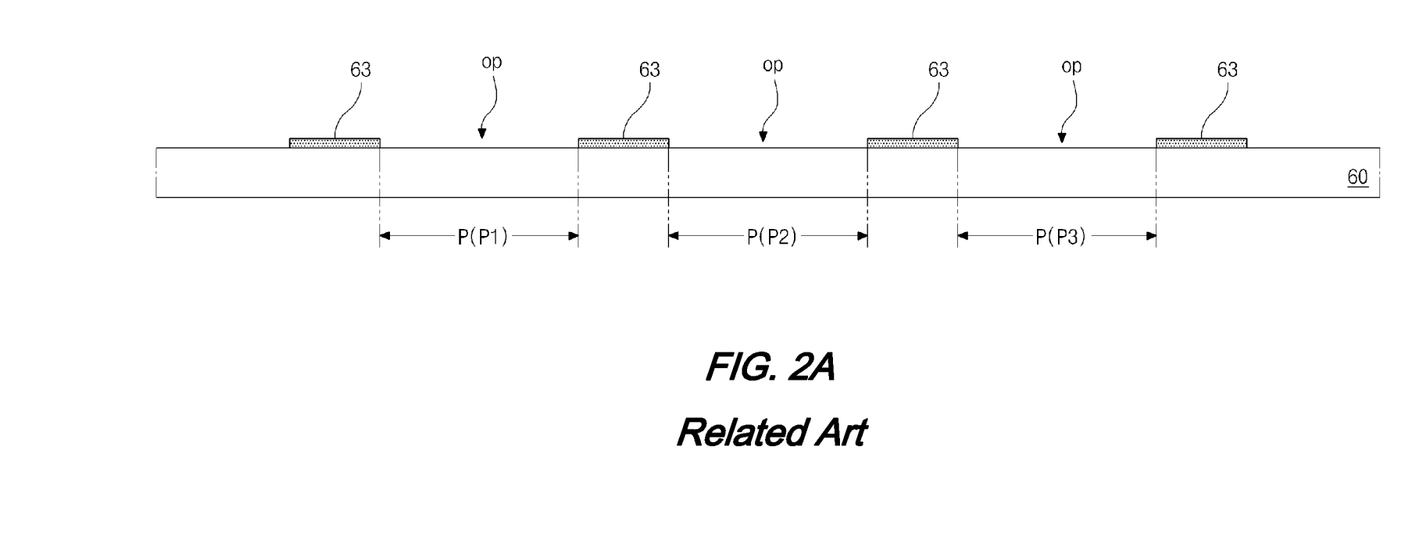
FIGS. 2A to 2D are cross-sectional views showing a color filter substrate for an LCD device in steps of a method of fabricating the same according to the related art.

In FIG. 2A, a metallic material is deposited on or resin is applied to an entire surface of a transparent insulating substrate 60 and then patterned through a mask process to thereby form a black matrix 63, which has an opening op corresponding to each pixel region P. The black matrix 63 is disposed in a border between adjacent pixel regions P and surrounds each pixel region P. The black matrix 63 blocks light leakage, which is caused by irregular operation of liquid crystal molecules, in regions excluding pixel electrodes of an array substrate (not shown).

Here, the black matrix 63 has a thickness of 0.9 micrometers to 1.1 micrometers. If the thickness of the black matrix 63 is less than 0.9 micrometers, the black matrix 63 has a low optical density (OD) and transmits light. Accordingly, image qualities are lowered. On the other hand, if the thickness of the black matrix 63 is more than 1.1 micrometers, a step difference between the substrate 60 and the black matrix 63 is considerably high. This causes disconnection of resist layers for color filter patterns to be formed in following steps.

Figure 2B:
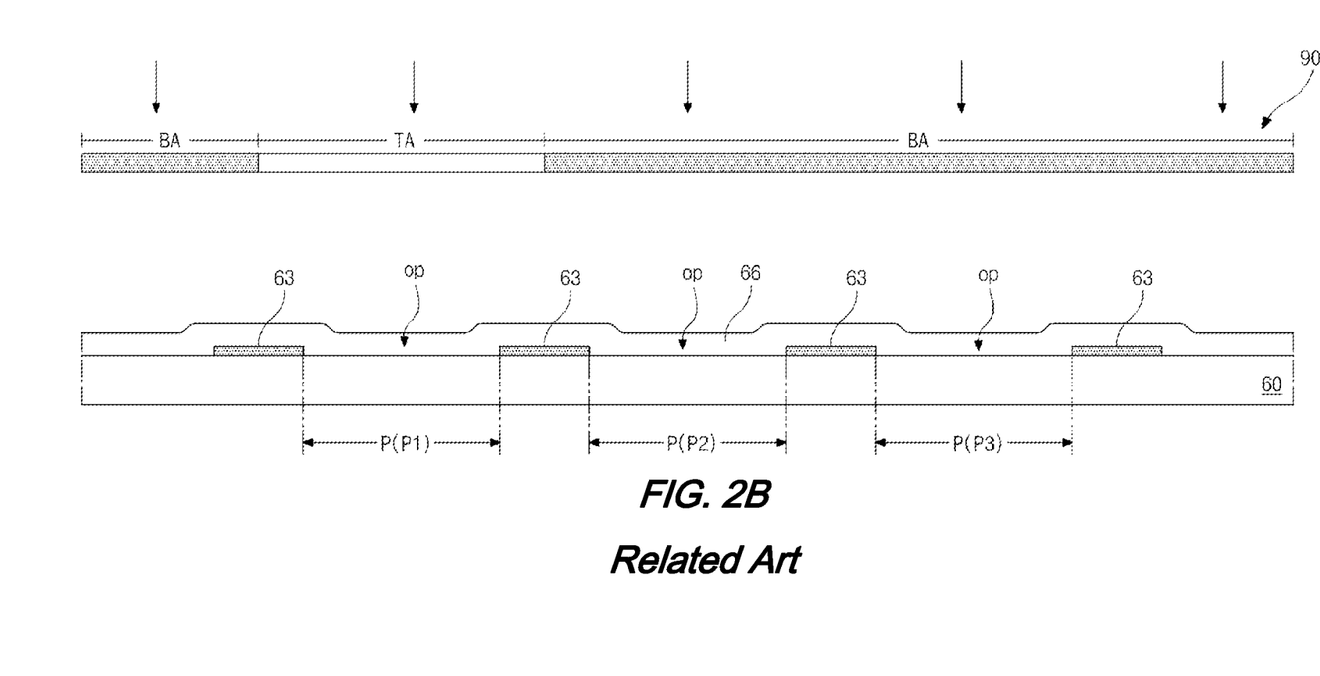

In FIG. 2B, a color resist, which may be one of red, green and blue resists, for example, a red one, is applied to an entire surface of the substrate 60 including the black matrix 63 thereon by a spin coating or bar coating method to thereby form a red resist layer 66. A mask 90 having a light-transmitting portion TA and a light-blocking portion BA is disposed over the red resist layer 66. The red resist layer 66 is exposed to light through the mask 60. Here, the red resist layer 66 is shown to have a negative property. That is, a portion of the red resist layer 66 that is not exposed to light is removed after a developing process.

Figure 2C:
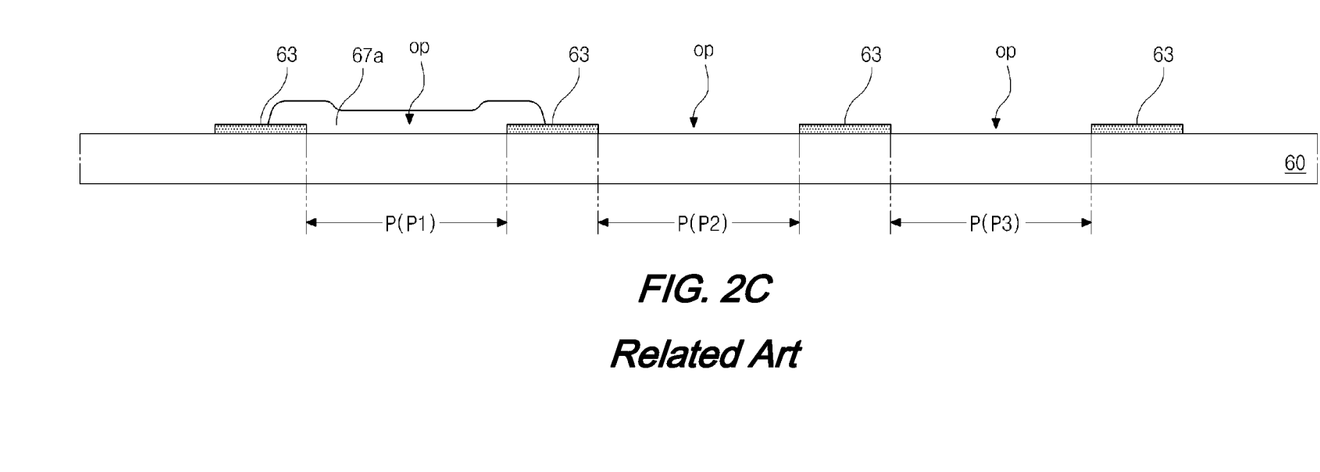

In FIG. 2C, the light-exposed red resist layer 66 of FIG. 2B is developed, and a red color filter pattern 67a is formed in a first pixel region P1 among the pixel regions P. The red color filter pattern 67a overlaps the black matrix 63 surrounding the first pixel region P1.

Figure 2D:
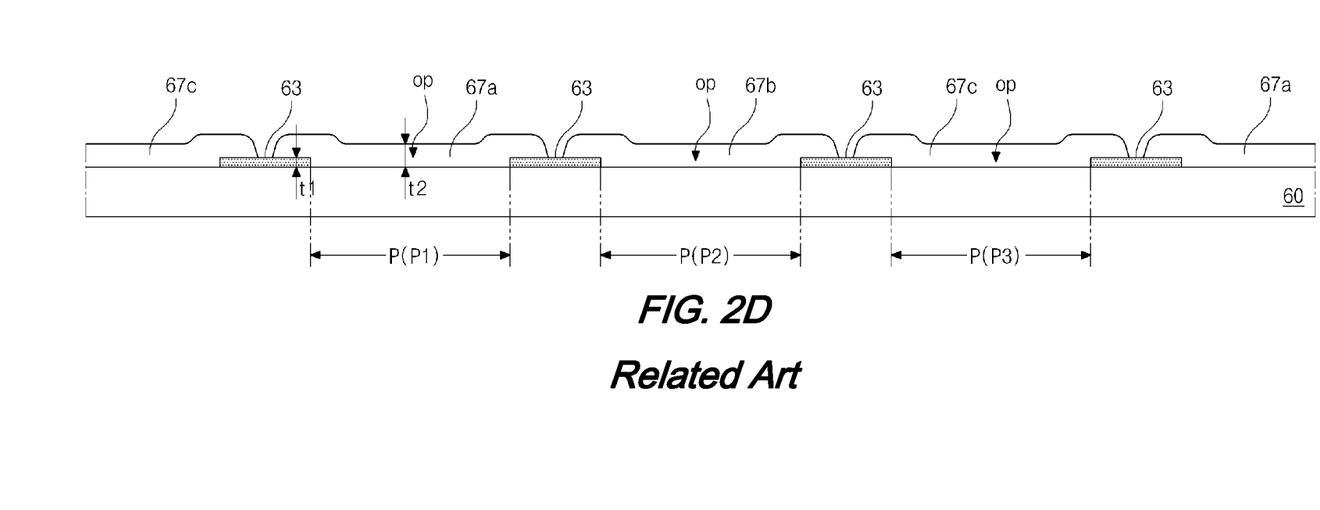

In FIG. 2D, green and blue color filter patterns 67b and 67c are respectively formed in second and third pixel regions P2 and P3 on the substrate 60 through similar processes to the red color filter pattern 67a in the first pixel region P1. The green and blue color filter patterns 67b and 67c overlap the black matrix 63.

Then, an overcoat layer (not shown) is formed on an entire surface of the substrate 60 including the red, green and blue color filter patterns 67a, 67b and 67c by applying an organic insulating material to the red, green and blue color filter patterns 67a, 67b and 67c. The overcoat layer protects the red, green and blue color filter patterns 67a, 67b and 67c and flattens the surface of the substrate 60 having the red, green and blue color filter patterns 67a, 67b and 67c. Next, a transparent conductive material such as indium-tin-oxide or indium-zinc-oxide is deposited on the overcoat layer to thereby form a common electrode (not shown). Accordingly, the color filter substrate for an LCD device is completed. Here, the common electrode may be omitted in a color filter substrate for an in-plane switching (IPS) LCD device.

However, in the pigment dispersion method, three patterning processes are performed, each of which includes steps of applying a color resist, exposing the color resist through a mask and developing the color resist. Accordingly, a production line is long and complicated. In addition, manufacturing time and costs are increased, and productivity is lowered.

SUMMARY OF THE INVENTION

Accordingly, the present invention is directed to a method of fabricating a color filter substrate for a liquid crystal display device that substantially obviates one or more of the problems due to limitations and disadvantages of the related art.

An advantage of the present invention is to provide a method of fabricating a color filter substrate for a liquid crystal display device that forms color filter patterns without a mask process.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, a method of fabricating a color filter substrate for a liquid crystal display device includes steps of forming a black matrix having a first thickness on a substrate, which includes first, second and third pixel regions, the black matrix surrounding each of the first, second and third pixel regions, forming red, green and blue color filter patterns using an inkjet apparatus, the red, green and blue color filter patterns disposed in the first, second and third pixel regions, respectively and having a second thickness, and forming an overcoat layer on a substantially entire surface of the substrate including the black matrix and the red, green and blue color filter patterns, the overcoat layer having a third thickness, wherein a difference between the first and second thicknesses is less than 15% of the third thickness such that the overcoat layer has an even top surface.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments, examples of which are illustrated in the accompanying drawings.

FIGS. 3A to 3G are cross-sectional views illustrating a color filter substrate for an LCD device in steps of a method of fabricating the same according to a first embodiment of the present invention. At this time, an inkjet apparatus is used.

Figure 3A:
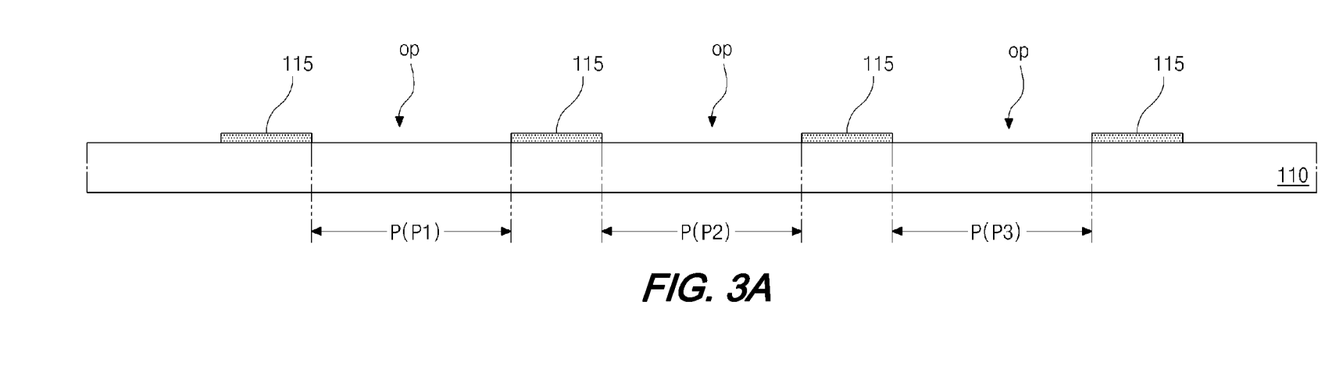
FIGS. 3A to 3G are cross-sectional views illustrating a color filter substrate for an LCD device in steps of a method of fabricating the same according to a first embodiment of the present invention.

In FIG. 3A, a metallic material such as chromium (Cr) or chromium oxide (CrOx) is deposited on or black resin is applied to an entire surface of a transparent insulating substrate 110 and then patterned through a mask process to thereby form a black matrix 115. The black matrix 115 has an opening op corresponding to each pixel region P and surrounds each pixel region P. The black matrix 115 has a thickness of about 0.9 micrometers to about 1.1 micrometers.

Next, as shown in FIGS. 3B to 3E, a color filter layer including red, green and blue color filter patterns is formed. Detail explanation will be followed.

Figure 3B:
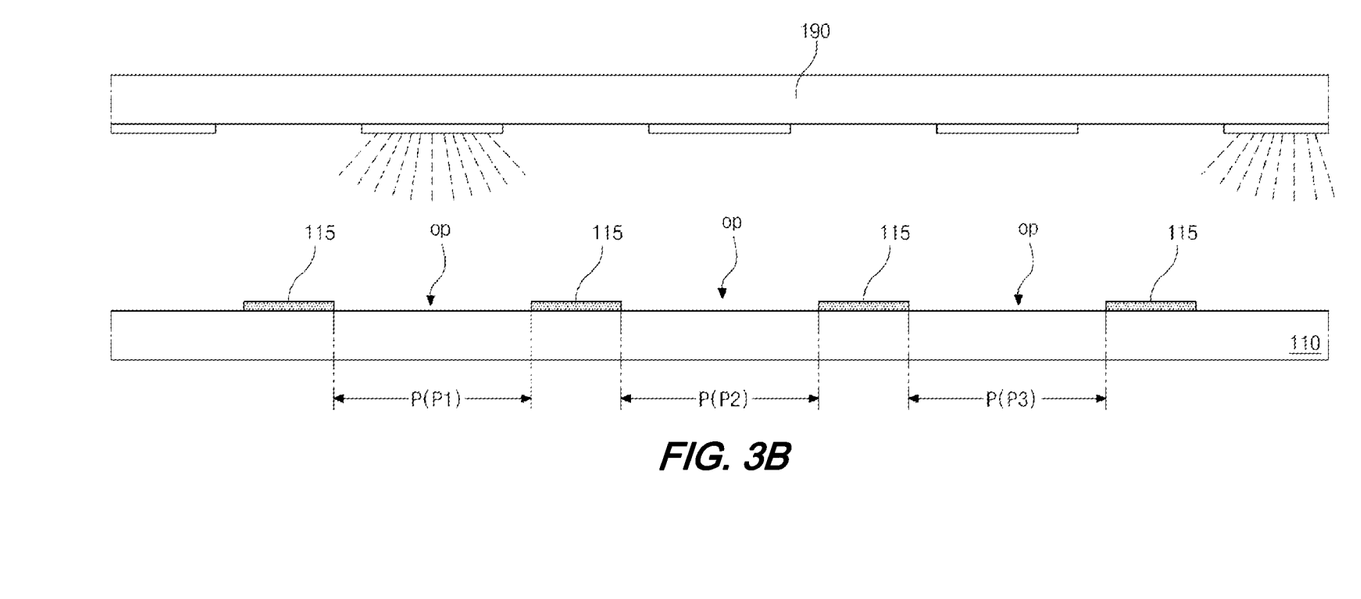
Figure 3C:
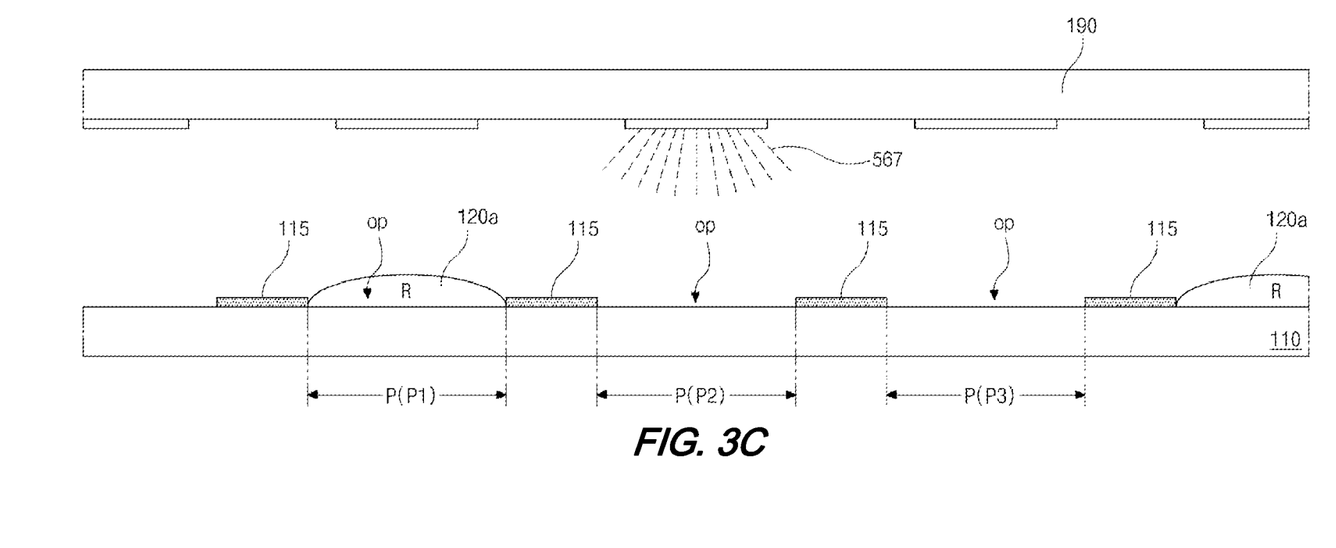

In FIG. 3B, the substrate 110 including the black matrix 115 thereon is disposed on a stage (not shown) of an inkjet apparatus (not shown), and a head 190 of the inkjet apparatus is positioned over the substrate 110. A color resist, for example, a red resist is applied to the substrate 110, moving the head 190 of the inkjet apparatus relatively to the substrate 110 along a direction, and a red color filter pattern 120a is formed in a first pixel region P1 as shown in FIG. 3C.

The head 190 of the inkjet apparatus may include a cartridge filled with the red resist, respectively. Alternatively, the red resist may be continuously supplied to the head 190 from the outside through a pipe, which may be installed in the inkjet apparatus.

Therefore, as the head 190 is in straight reciprocal motion and moves from side to side over the substrate 110 having the black matrix 115 at a uniform rate, the red resist is applied, and the red color filter pattern 120a is selectively formed only in the first pixel region P1.

Figure 3D:
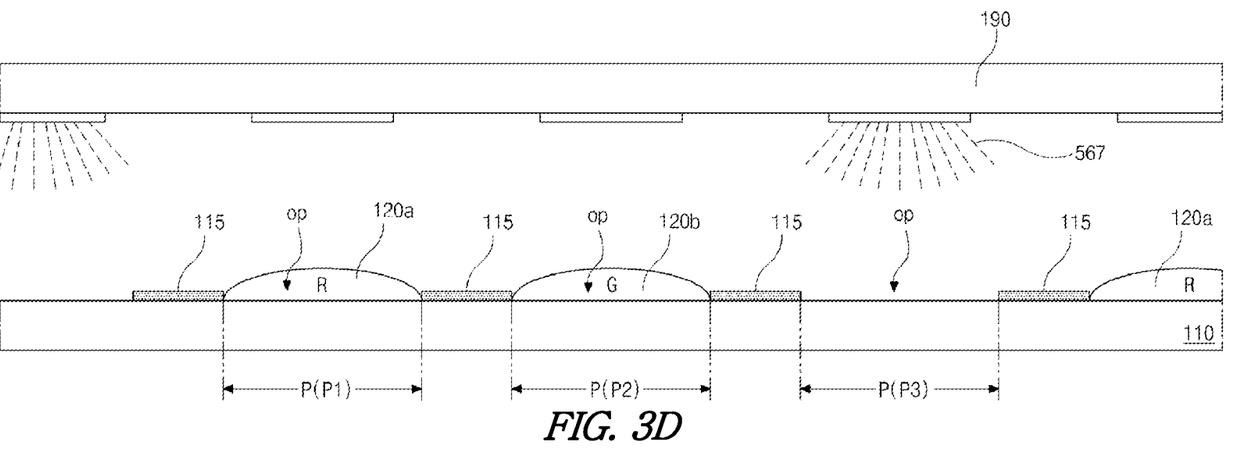
Figure 3E:
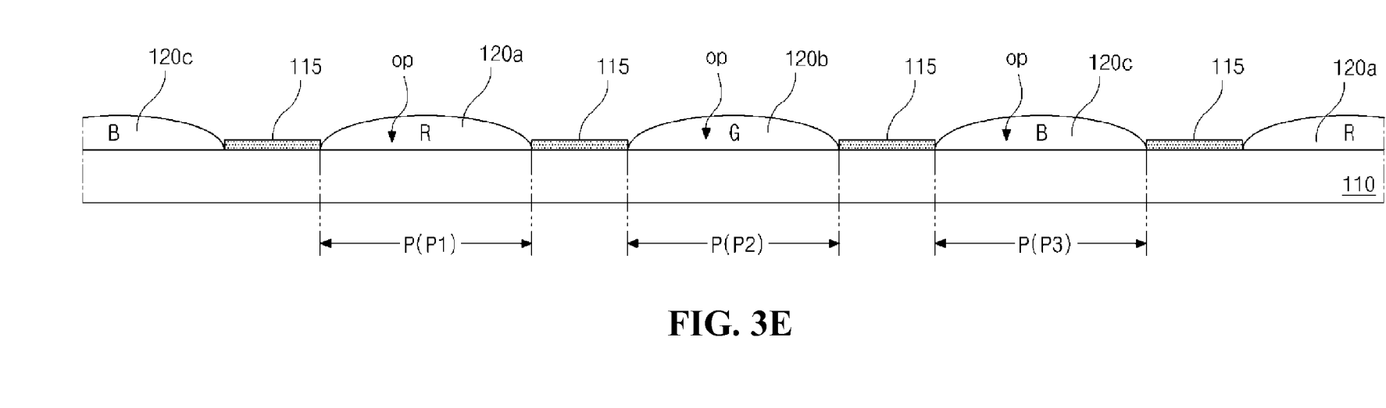

In FIGS. 3D and 3E, green and blue color filter patterns 120b and 120c are respectively formed in second and third pixel regions P2 and P3 on the substrate 110 through similar processes to the red color filter pattern 120a.

Here, different heads for respectively applying the red, green and blue resists may be used.

By using the inkjet apparatus, which includes the head 190 for applying each of the red, green and blue resists, the red, green and blue color filter patterns 120a, 120b and 120c can be selectively formed in respective pixel regions P without a mask process.

Accordingly, the production line for the color filter substrate is simplified, and the manufacturing time is decreased as compared with the pigment dispersion method that includes a patterning process using a mask. The productivity can be maximized.

Figure 3F:
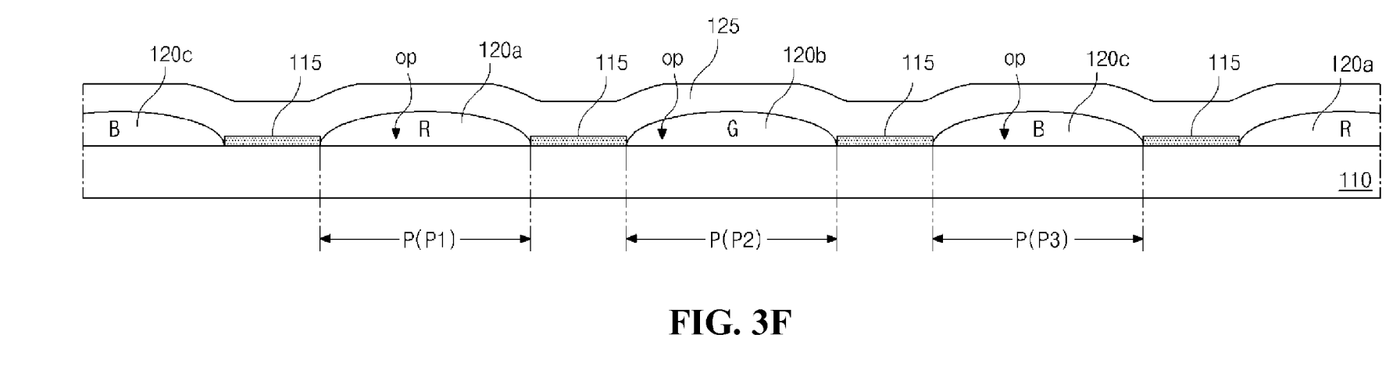

In FIG. 3F, an overcoat layer 125 is formed by applying a transparent organic insulating material to an entire surface of the substrate 110, which includes the red, green and blue color filter patterns 120a, 120b and 120c in the first, second and third pixel regions P1, P2 and P3, respectively. The organic insulating material may be benzocyclobutene (BCB) or photo acryl. The overcoat layer 125 protects the red, green and blue color filter patterns 120a, 120b and 120c and flattens the surface of the substrate 110 having the red, green and blue color filter patterns 120a, 120b and 120c.

Figure 3G:
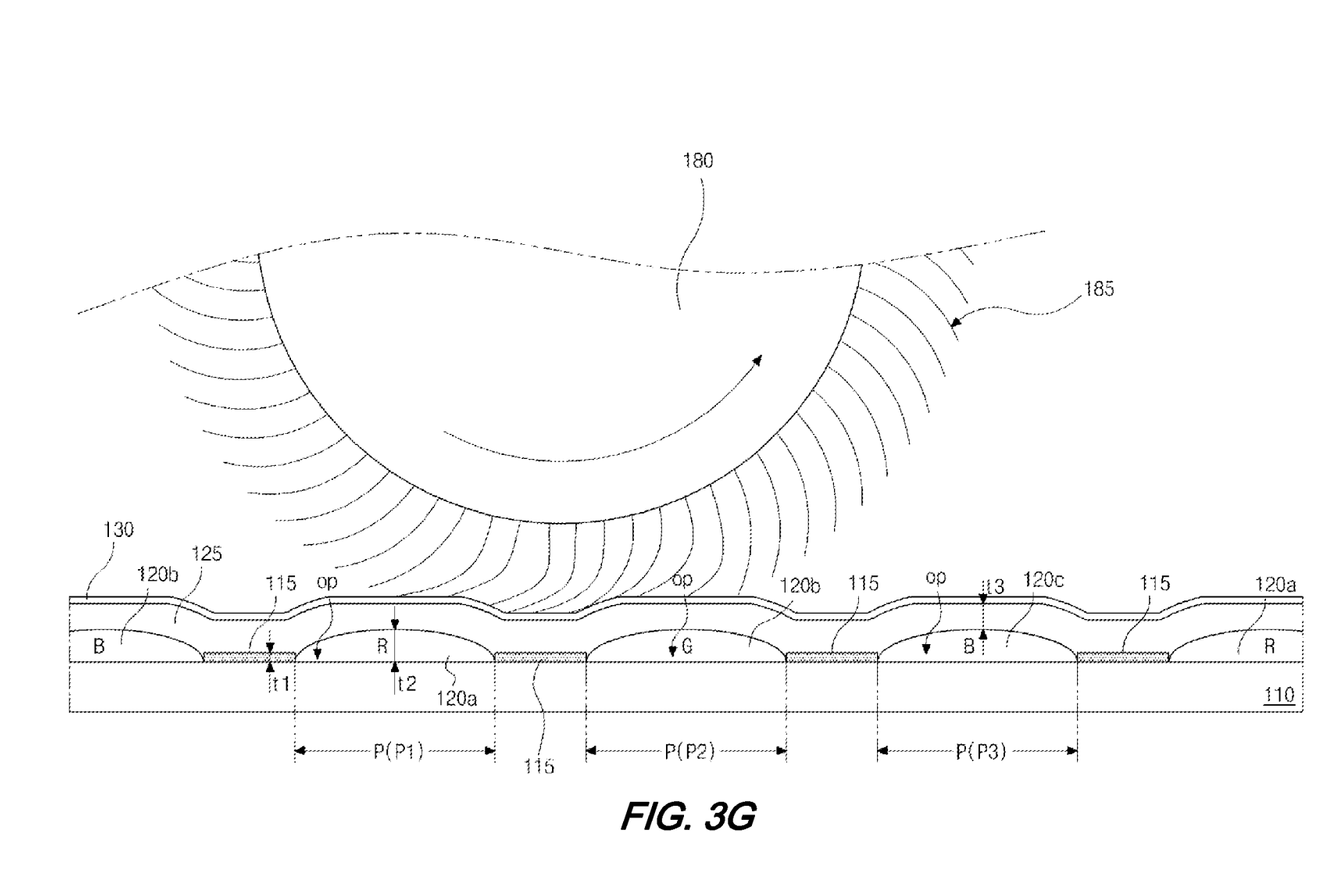

In FIG. 3G, an alignment layer 130 is formed by applying a high molecular substance, for example, polyimide, to the overcoat layer 125. The alignment layer 130 determines an initial arrangement of liquid crystal molecules of a liquid crystal layer (not shown), which will be interposed between the color filter substrate and an array substrate (not shown) later.

Next, the substrate 110 including the alignment layer 130 thereon is disposed on a stage (not shown) of a rubbing apparatus (not shown), and a rubbing process is performed. The rubbing process is to rub a top surface of the alignment layer 130 of the high molecular substance with a rubbing cloth (not shown) such as rayon and to arrange functional groups of the high molecular substance along a direction. That is, the initial arrangement of the liquid crystal molecules depends on the arrangement of the functional groups forming a surface of the alignment layer 130, and the rubbing process is carried out to arrange the functional groups with a predetermined angle along the direction.

At this time, in the rubbing process, a rubbing roll 180, a surface of which a rubbing cloth, for example, a rayon cloth having a plurality of fibers 185 at its surface is attached to, is rotated at high speed such that ends of the fibers 185 contact a top surface of the alignment layer 130, while the stage is moved along the direction. The top surface of the alignment layer 130 is rubbed with the fibers 185, and the functional groups are arranged along the direction.

Like this, by rubbing the top surface of the alignment layer 130, the color filter substrate for an LCD device according to the first embodiment of the present invention is completed.

As stated above, in the color filter substrate according to the first embodiment of the present invention, the black matrix 115 has a first thickness t1 of about 0.9 micrometers to about 1.1 micrometers. The red, green and blue color filter patterns 120a, 120b and 120c, which are disposed in the pixel regions P surrounded by the black matrix 115, have a second thickness t2 of about 1.8 micrometers to about 2.2 micrometers at their central portions. The overcoat layer 125, which is disposed on the red, green and blue color filter patterns 120a, 120b and 120c and the black matrix 115 all over the surface of the substrate 110, has a third thickness t3 of about 2.7 micrometers to 3 micrometers.

Here, even though the overcoat layer 125 is formed of an organic material, the overcoat layer 125 may have an uneven top surface due to the step difference between the black matrix 115 and the red, green and blue color filter patterns 120a, 120b and 120c.

In general, when an organic material layer is formed by a bar coating apparatus or a spin coating apparatus, a maximum thickness of the organic material layer that can be formed without problems is about 3 micrometers. Additionally, if the step difference between lower layers is less than 15% of the thickness of the organic material layer, the organic material layer can have a flat top surface. However, if the step difference between the lower layers is more than 15% of the thickness of the organic material layer, the organic material layer may have an uneven top surface like the overcoat layer 125 of the first embodiment as mentioned above.

When the overcoat layer 125 has the uneven top surface, the alignment layer 130 over the overcoat layer 125 also has an uneven top surface. Accordingly, if the rubbing process is performed to the alignment layer 130 having the uneven top surface, there may be a difference between friction forces in embossed portions and depressed portions of the top surface of the alignment layer 130 contacting the fibers 185 of the rubbing cloth. The top surface of the alignment layer 130 cannot have a uniform and proper anchoring energy, and the initial arrangement of the liquid crystal molecules may not be maintained. Or, the fibers 185 of the rubbing cloth attached to the rubbing roll 180, which rotates at high speed, may contact corners between the embossed portions and the depressed portions and may be damaged. This may cause a difference between friction forces in areas corresponding to the damaged fibers 185 and result in a rubbing problem.

In a second embodiment of the present invention, the rubbing problem can be solved.

FIGS. 4A to 4E are cross-sectional views illustrating a color filter substrate for an LCD device in steps of a method of fabricating the same according to a second embodiment of the present invention.

Figure 4A:
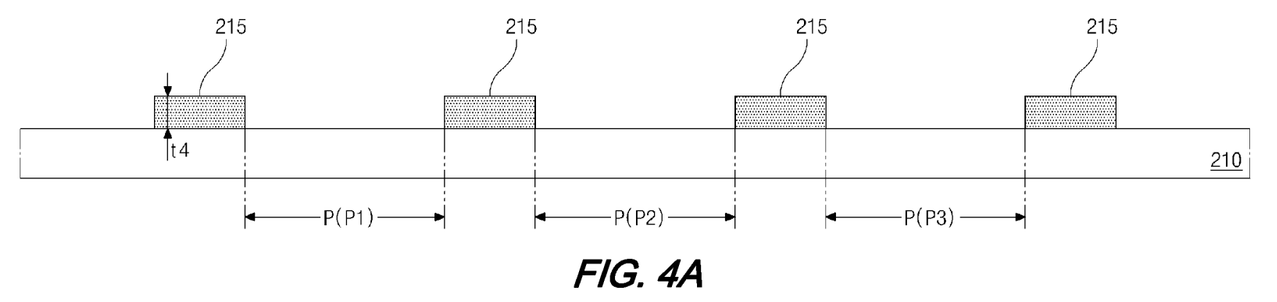
FIGS. 4A to 4E are cross-sectional views illustrating a color filter substrate for an LCD device in steps of a method of fabricating the same according to a second embodiment of the present invention.

In FIG. 4A, a metallic material is deposited on or black resin is applied to an entire surface of a transparent insulating substrate 210 and then patterned through a mask process to thereby form a black matrix 215. The black matrix 215 has an opening op corresponding to each pixel region P and surrounds each pixel region P. The black matrix 215 has a fourth thickness t4 of about 1.8 micrometers to about 2.1 micrometers such that the fourth thickness t4 coincides with a thickness of color filter patterns to be formed later.

In the related art, where the color filter patterns are formed by a pigment dispersion method, if the black matrix has the thickness of 1.8 micrometers to 2.1 micrometers, there is a relatively high step difference between the black matrix and the substrate. When the color resist is applied to the substrate having the black matrix by a bar coating apparatus or a spin coating apparatus to thereby form the color resist layer having a thickness of about 1.8 micrometers to 2.1 micrometers, the color resist layer may be disconnected due to the step difference. Accordingly, to prevent this, the black matrix of the related art has the thickness of 0.9 micrometer to 1.1 micrometers.

However, in the present invention, a color resist can be selectively applied only to an area corresponding to the opening op of the black matrix 215 without disconnection because an inkjet apparatus (not shown) is used. Therefore, even though the black matrix 215 has the fourth thickness t4 of about 1.8 micrometers to 2.1 micrometers corresponding to the thickness of the color filter patterns, there is no problem.

Figure 4B:
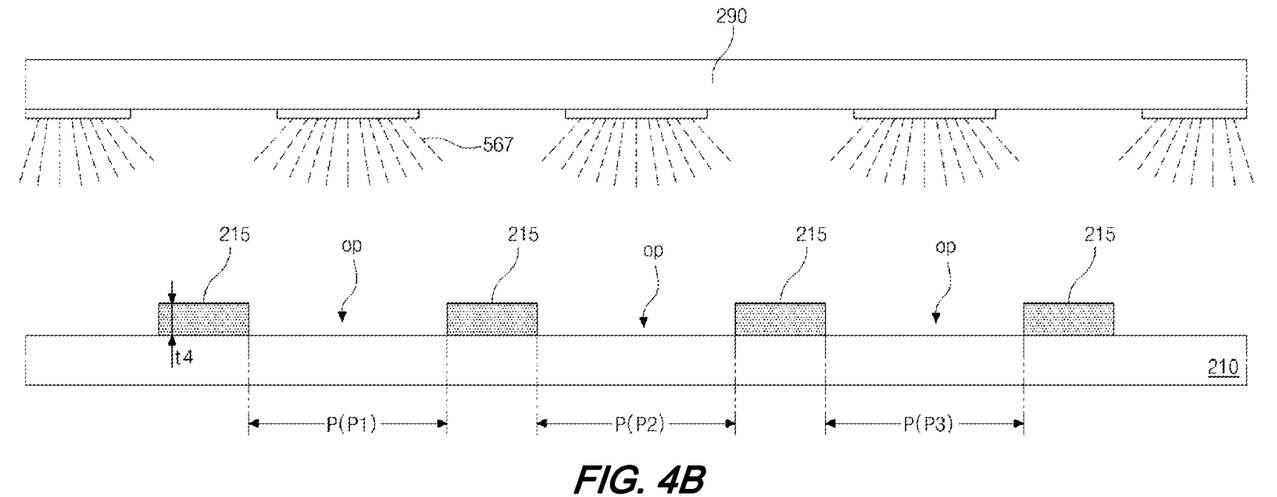
Figure 4C:
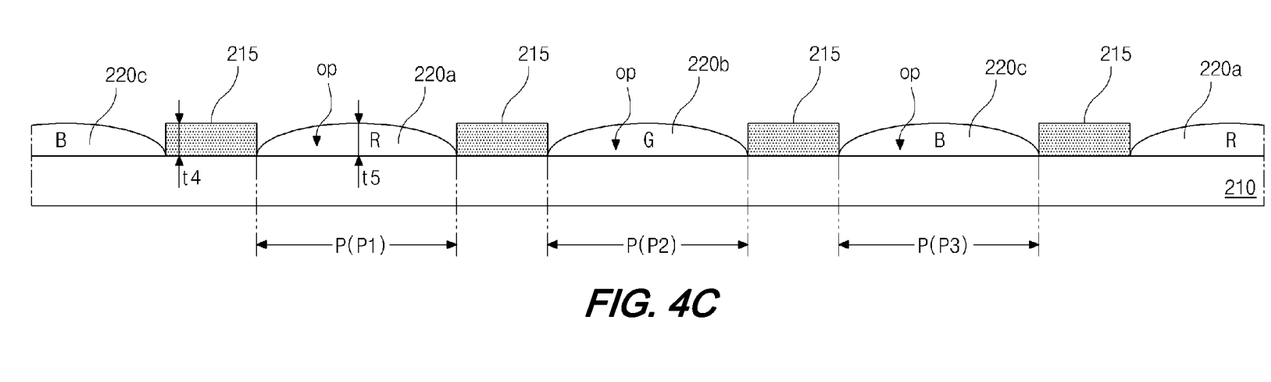

Next, in FIG. 4B, the substrate 210 including the black matrix 215 thereon is disposed on a stage (not shown) of an inkjet apparatus (not shown), and a head 290 of the inkjet apparatus is positioned over the substrate 210. Color resists are applied to the substrate 210, moving the head 290 of the inkjet apparatus relatively to the substrate 210 along a direction, and red, green and blue color filter patterns 220a, 220b and 220c are formed in first, second and third pixel regions P1, P2 and P3, respectively, as shown in FIG. 4C.

In the first embodiment, the heads for respectively applying the red, green and blue resists are used to sequentially form the red color filter pattern in the first pixel region, the green color filter pattern in the second pixel region, and the blue color filter pattern in the third pixel region.

On the other hand, in the second embodiment, the head 290 of the inkjet apparatus may have or be connected to cartridges filled with red, green and blue resists, respectively. Accordingly, the red, green and blue resists may be simultaneously applied, and red, green and blue color filter patterns 220a, 220b and 220c may be formed in first, second and third pixel regions P1, P2 and P3, respectively, at the same time. By the way, in the second embodiment, the red, green and blue color filter patterns 220a, 220b and 220c may be sequentially formed in the first, second and third pixel regions P1, P2 and P3 as the first embodiment.

In any method using an inkjet apparatus, the mask process is not required because the red, green and blue color filter patterns 220a, 220b and 220c are selectively formed in the pixel regions P, respectively. Moreover, waste of the color resist, which is caused by applying it to an entire surface of the substrate 210 and patterning it, can be prevented.

At this time, the red, green and blue color filter patterns 220a, 220b and 220c, which are formed by the inkjet apparatus (not shown), have a fifth thickness t5 of about 1.8 micrometers to about 2.1 micrometers. The fifth thickness t5 may be the same as the fourth thickness t4 of the black matrix 215 or may be larger than the fourth thickness t4 of the black matrix 215 with a difference between the thicknesses t4 and t5 within about 0.3 micrometers.

In the meantime, although not shown in the figure, a baking process may be performed to the substrate 210, where the red, green and blue resists are applied in the first, second and third pixel regions P1, P2 and P3 by the inkjet apparatus. Thus, moistures in the red, green and blue resists may be removed, and at the same time, the red, green and blue resists may be hardened to form the red, green and blue color filter patterns 220a, 220b and 220c. After the baking process, the red, green and blue color filter patterns 220a, 220b and 220c may have a decreased thickness as compared to when applied by the inkjet apparatus.

By considering the decrease in the thickness, when the color resist is applied by the inkjet apparatus, it is desirable that the applied color resist has a thickness of about 2.1 micrometers to about 2.4 micrometers such that the fifth thickness t5 of about 1.8 micrometer to about 2.1 micrometers is obtained after the baking process.

Here, the fifth thickness of about 1.8 micrometer to about 2.1 micrometers relates to color purity and light transmittance. More particularly, when the fifth thickness t5 is larger than 2.1 micrometers, the color impurity is improved, but the light transmittance is lowered. On the other hand, when the fifth thickness t5 is smaller than 1.8 micrometers, the light transmittance is increased, whereby the brightness is improved, but the color purity is lowered to thereby affect the image qualities. Accordingly, the fifth thickness t5 is within a range of about 1.8 micrometer to about 2.1 micrometers such that the color purity and the light transmittance are optimized.

Figure 4D:
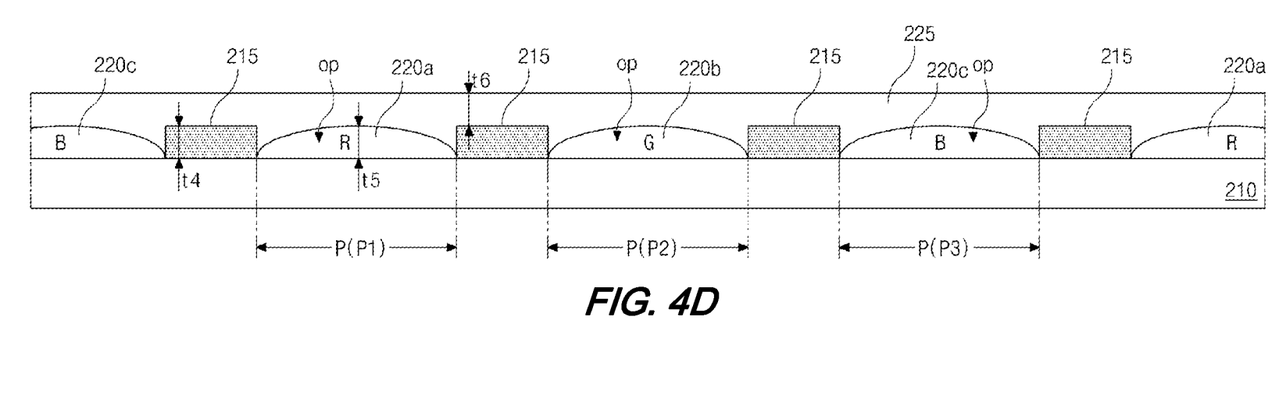

Next, in FIG. 4D, an overcoat layer 225 is formed by applying a transparent organic insulating material to an entire surface of the substrate 210, which includes the red, green and blue color filter patterns 220a, 220b and 220c in the first, second and third pixel regions P1, P2 and P3, respectively. The organic insulating material may be benzocyclobutene (BCB) or photo acryl. The overcoat layer 225 may have a sixth thickness t6 of about 2.7 micrometers to about 3 micrometers and have a flat top surface.

In the second embodiment of the present invention, the fourth thickness t4 of the black matrix 215 is within a range of about 1.8 micrometers to about 2.1 micrometers, and the fifth thickness t5 of the red, green and blue color filter patterns 220a, 220b and 220c in the first, second and third pixel regions P1, P2 and P3, each of which is surrounded by the black matrix 215, is within a range of about 1.8 micrometers to about 2.1 micrometers. Therefore, there is substantially no difference between the thicknesses of the black matrix 215 and the color filter patterns 220a, 220b and 220c. Even though there is a difference between the thicknesses of the black matrix 215 and the color filter patterns 220a, 220b and 220c, the difference, which corresponds to a step difference between the black matrix 215 and the color filter patterns 220a, 220b and 220c, is within about 0.3 micrometers. The step difference is less than 15% of the sixth thickness t6 of the overcoat layer 225 within a range of about 2.7 micrometers to about 3 micrometers, and thus the overcoat layer 225 has an even top surface all over the substrate 210 regardless of areas for the black matrix 215 and the red, green and blue color filter patterns 220a, 220b and 220c.

Figure 4E:
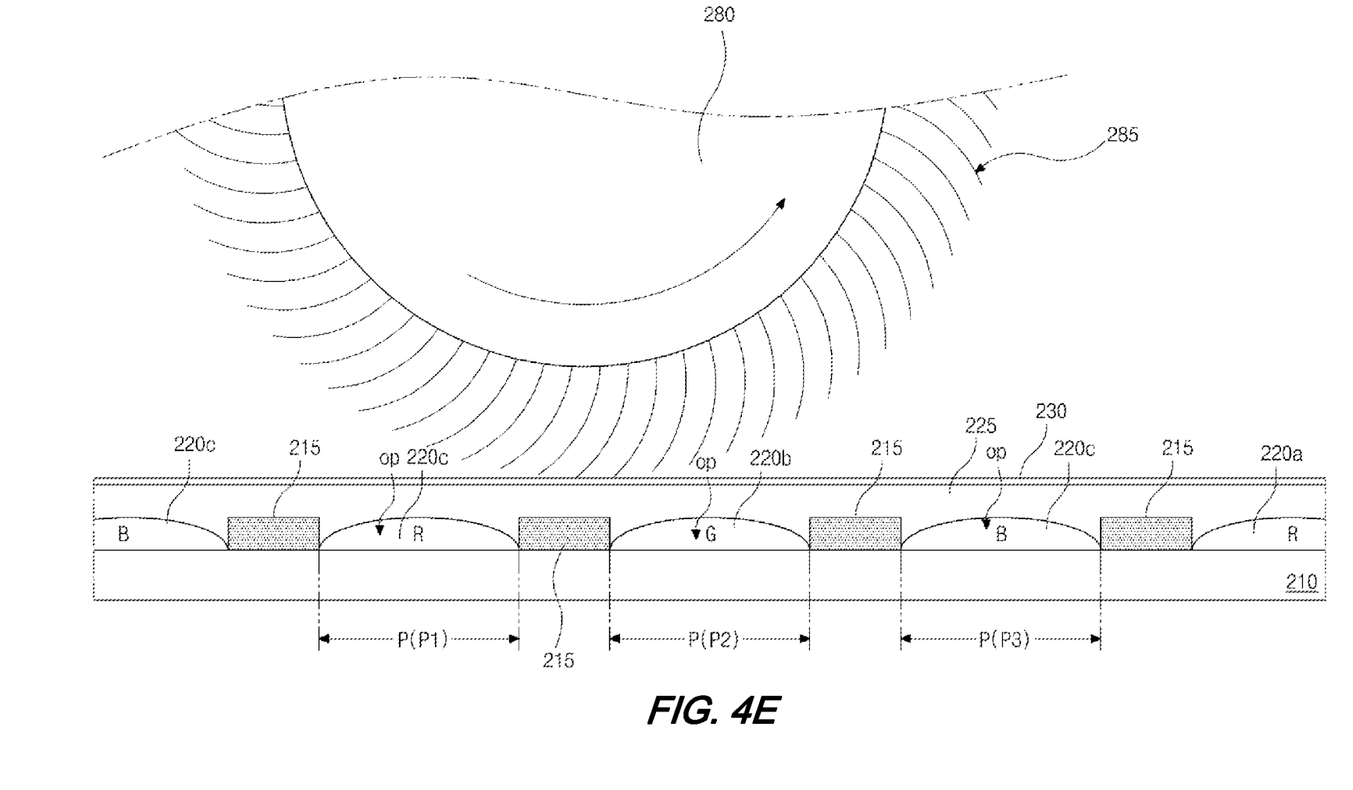

In FIG. 4E, an alignment layer 230 is formed on the overcoat layer 225 by applying a high molecular substance, for example, polyimide, to the substrate 210 including the overcoat layer 225 with the flat top surface thereon. Here, the alignment layer 230 also has an even top surface because the top surface of the overcoat layer 225 is flat.

At this time, by depositing a transparent conductive material before forming the alignment layer 230, a common electrode (not shown) may be further formed between the overcoat layer 225 and the alignment layer 230. In a color filter substrate for a twisted nematic (TN) mode LCD device, it is essential to form the common electrode between the overcoat layer and the alignment layer. In a color filter substrate for an in-plane switching (IPS) mode LCD device, the common electrode is omitted.

When the common electrode (not shown) is formed of the transparent conductive material, the common electrode has an uneven top surface, too. A layer formed by a deposition method is influenced by contour of a lower layer and has a uniform thickness all over the substrate. In the second embodiment, since the overcoat layer 225 has the flat top surface, the common electrode, which is formed by depositing the transparent conductive material, also has the flat top surface. Additionally, the alignment layer 230 on the common electrode has the flat top surface.

Next, the substrate 210 including the alignment layer 230 thereon is disposed on a stage (not shown) of a rubbing apparatus (not shown), and a rubbing process is performed. At this time, since the alignment layer 230 has the flat top surface without unevenness, there is no problem that fibers 285 of a rubbing cloth are damaged by impacts due to contact with corners of unevenness when the rubbing cloth is rotated and rubbed with the alignment layer 230. Accordingly, the rubbing problem such as damages of the rubbing cloth can be prevented. Moreover, the friction force is uniform all over the areas of the substrate 210 because embossed portions and depressed portions are not formed at the top surface of the alignment layer, and there are no differences in rubbing density or rubbing pressure. Therefore, the light leakage, which is caused owing to the areas differently rubbed, can be prevented.

Like this, by rubbing the top surface of the alignment layer 230, the color filter substrate for an LCD device according to the second embodiment of the present invention is completed.

In the present invention, the color filter layer including the red, green and blue color filter patterns is formed using the inkjet apparatus, and the mask process for forming a pattern is not necessary. Accordingly, the manufacturing process are simplified, and the manufacturing costs are lowered.

Furthermore, to prevent the rubbing problem due to the step difference between the black matrix and the color filter layer, which is formed by the inkjet apparatus, the black matrix is formed to have an optimized thickness, and thus the productivity is improved.

It will be apparent to those skilled in the art that various modifications and variations can be made in the color filter substrate for an LCD device and fabricating method thereof of the present invention without departing from the spirit or scope of the invention. Thus, it is intended that the present invention cover the modifications and variations of this invention provided they come within the scope of the appended claims and their equivalents.

What is claimed is:

1. A method of fabricating a color filter substrate for a liquid crystal display device, the method comprising:
    forming a black matrix having a first thickness on a substrate, which includes first, second, and third pixel regions, the black matrix surrounding each of the first, second, and third pixel regions;
    forming red, green, and blue color filter patterns using an inkjet apparatus, the red, green, and blue color filter patterns disposed in the first, second, and third pixel regions, respectively and having a same second thickness; and
    forming an overcoat layer on a substantially entire surface of the substrate including directly on the black matrix and the red, green, and blue color filter patterns, the overcoat layer having a third thickness,
    wherein a difference between the first and second thicknesses is less than 15% of the third thickness such that the overcoat layer has an even top surface,
    wherein the second thickness is larger than the first thickness, and
    wherein the third thickness is larger than the second thickness.

2. The method according to claim 1, wherein each of the first and second thicknesses is within a range of 1.8 micrometers to 2.1 micrometers.

3. The method according to claim 1, wherein the third thickness is within a range of 2.7 micrometers to 3.0 micrometers.

4. The method according to claim 1, further comprising forming an alignment layer over the overcoat layer, the alignment layer having an even top surface.

5. The method according to claim 4, further comprising forming a common electrode by depositing a transparent conductive material over the overcoat layer before forming the alignment layer, the common electrode having an even top surface.

6. The method according to claim 1, wherein forming the red, green, and blue color filter patterns includes applying red, green, and blue resists to the first, second, and third pixel regions, respectively, using the inkjet apparatus.

7. The method according to claim 6, wherein applying the red, green, and blue resists are performed sequentially or carried out simultaneously.

8. The method according to claim 6, wherein forming the red, green, and blue color filter patterns includes hardening the red, green, and blue resists applied to the first, second, and third pixel regions, respectively.

9. A color filter substrate for a liquid crystal display device, comprising:
    a substrate including first, second, and third pixel region;
    a black matrix having a first thickness on the substrate, the black matrix surrounding each of the first, second, and third pixel regions;
    red, green, and blue color filter patterns in the first, second, and third pixel regions excluding the black matrix, respectively, and having a same second thickness; and
    an overcoat layer on a substantially entire surface of the substrate and covering the black matrix and the red, green, and blue color filter patterns, the overcoat layer directly on the black matrix and the red, green, and blue color filter patterns and having a third thickness,
    wherein a difference between the first and second thicknesses is less than 15% of the third thickness such that the overcoat layer has an even top surface,
    wherein the second thickness is larger than the first thickness, and
    wherein the third thickness is larger than the second thickness.

10. The color filter substrate according to claim 9, wherein each of the first and second thicknesses is within a range of 1.8 micrometers to 2.1 micrometers.

11. The color filter substrate according to claim 9, wherein the third thickness is within a range of 2.7 micrometers to 3.0 micrometers.

12. The color filter substrate according to claim 9, further comprising an alignment layer over the overcoat layer, the alignment layer having an even top surface.

13. The color filter substrate according to claim 12, further comprising a common electrode between the overcoat layer and the alignment layer, the common electrode having an even top surface.

14. The color filter substrate according to claim 9, wherein each of the red, green, and blue color filter patterns has a convex top surface.

* * * * *